United States Patent Office 3,576,618
Patented Apr. 27, 1971

3,576,618
2-TRICHLOROACETAMIDINE HERBICIDES
Eva Lea Samuel, Bentleigh, Victoria, Australia, assignor to Monsanto Chemicals (Australia) Limited
No Drawing. Filed Sept. 18, 1967, Ser. No. 668,634
Claims priority, application Australia, Sept. 19, 1966, 11,209/66
Int. Cl. A01n 9/20; C07c 129/08
U.S. Cl. 71—121         8 Claims

ABSTRACT OF THE DISCLOSURE

Pre-emergent or post-emergent growth of undesired vegetation is controlled by the application of at least one N-trichloroacetamidine of the formula:

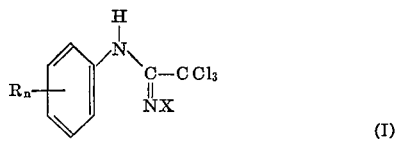

(I)

wherein $n$ is an integer from 0 to 2 inclusive; R is selected from the group consisting of halogen, nitro, alkyl of not more than six carton atoms, and alkoxy of not more than six carbon atoms; and X is selected from the group consisting of hydrogen and chlorine. Compounds in which X in the above formula is chlorine are novel compounds.

---

This invention relates to herbicidal compositions and methods for controlling or destroying undesired vegetation, the invention being based upon the discovery that N-trichloroacetamidines having the formula:

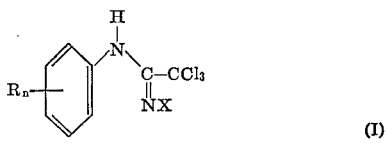

(I)

wherein $n$ is an integer from 0 to 2 inclusive; R is selected from the group consisting of halogen, nitro, alkyl of not more than six carbon atoms, and alkoxy of not more than six carbon atoms; and X is selected from the group consisting of hydrogen and chlorine, possess herbicidal activity and are useful as a pre-emergent herbicide against both grasses and broad leaf plants. The specified compounds are particularly effective against grasses.

Examples of specific compounds of the above structural formula which are useful for the purpose of the invention are N-(p-chlorophenyl)-2,2,2-trichloroacetamidine;
N-(3,4-dichlorophenyl)-2,2,2-trichloroacetamidine;
N-(p-nitrophenyl)-2,2,2-trichloroacetamidine;
N-(o-chloro-p-nitrophenyl)-2,2,2-trichloroacetamidine;
N-(2,4-dinitrophenyl)-2,2,2-trichloroacetamidine;
N-(p-methylphenyl)-2,2,2-trichloroacetamidine;
N-(3,4-dimethylphenyl)-2,2,2-trichloroacetamidine;
N-(o-chloro-p-methylphenyl)-2,2,2-trichloroacetamidine;
N-(2-methyl-6-tert.-butylphenyl)2,2,2-trichloroacetamidine;
N-(p-methoxyphenyl)-2,2,2-trichloroacetamidine;
N-(p-ethoxyphenyl)-2,2,2-trichloroacetamidine;
N-(p-chlorophenyl)-N'-chloro-2,2,2-trichloroacetamidine;
N-(3,4-dichlorophenyl)-N'-chloro-2,2,2-trichloroacetamidine;
N-(p-nitrophenyl)-N'-chloro-2,2,2-trichloroacetamidine;
N-(o-chloro-p-nitrophenyl)-N'-chloro-2,2,2-trichloroacetamidine;
N-(2,4-dinitrophenyl)-N'-chloro-2,2,2-trichloroacetamidine;
N-(p-methylphenyl)-N'-chloro-2,2,2-trichloroacetamidine;
N-(3,4-dimethylphenyl)-N'-chloro-2,2,2-trichloroacetamidine;
N-(o-chloro-p-methylphenyl)-N'-chloro-2,2,2-trichloroacetamidine;
N-(2-methyl-6-tert.-butylphenyl)-N'-chloro-2,2,2-trichloroacetamidine;
N-(p-methoxyphenyl)-N'-chloro-2,2,2-trichloroacetamidine;
N-(p-ethoxyphenyl)-N'-chloro-2,2,2-trichloroacetamidine;
N-(2,4-dimethylphenyl)-2,2,2-trichloroacetamidine;
N-(m-methylphenyl)-2,2,2-trichloroacetamidine;
N-(2-methyl-5-chlorophenyl)-2,2,2-trichloroacetamidine;
N-(2-chloro-4-methyl)-2,2,2-trichloroacetamidine;
N-p-t-butylphenyl)-2,2,2-trichloroacetamidine;
N-(2-methoxy-5-methylphenyl)-2,2,2-trichloroacetamidine;
N-(m-methoxyphenyl)-2,2,2-trichloroacetamidine.

The method of the invention consists in contacting soil containing pre-emergent undesired vegetation, or, contacting undesired post-emergent vegetation, with a herbicidally-effective amount of at least one of said N-trichloroacetamidines. The method of the invention can be carried out by applying herbicidal compositions containing at least one said N-trichloroacetamidine as the essential herbicidal component, in suitable concentrations for the purpose, such herbicidal compositions generally containing from about 0.5% to about 95% by weight of the active compound. These herbicidal compositions or formulations can be prepared by admixing the active compound or a mixture of such compounds with a liquid or solid adjuvant, the resultant compositions being ready for application to soil containing undesired pre-emergent or post-emergent vegetation, using conventional equipment for the purpose. The term adjuvant as used hereinafter and in the appended claims connotes diluents, extenders, carriers, surface active agents, solvents and conditioning agents to provide compositions in the form of finely divided particulate solids, granules, pellets, solutions, suspensions, dispersions or emulsions. Thus, the herbicidal compositions or formulations can be prepared in the form of solids or liquids.

In general the toxicant N-trichloroacetamidines utilized in accordance with the invention are solids only slightly soluble in water, but readily soluble in hydrocarbon solvents such as kerosene, toluene or heavy aromatic naphthenes. When dissolved in such solvents the said toxicants can be readily emulsified with water by the addition of appropriate surface active agent and sprayed onto the soil surface, using water as the carrier. Alternatively, the said toxicants can be intimately mixed with a surface active agent, with or without diluents, and then can be readily suspended in water and applied in water. Alternatively, the said toxicants can be applied to the soil surface as a solid either in finely divided powder form or in granular form, with the optional use of an inert ingredient as a carrier.

Solid compositions can be prepared in the form of ready-to use compositions, such as dust mixtures prepared by admixing the active material with finely-divided inert carriers to give a homogeneous free-flowing composition suitable for direct application to soil or plants. The finely-divided inert carrier can be chosen from such materials as talc, clay, bentonite, pumice, fuller's earth, pyrophyllite and diatomaceous earth, or flours such as walnut shell, wheat, redwood, soybean, cottonseed, or other inert dust materials conventionally employed in preparing herbicidal compositions in powder form. Alternatively, the active compound can be applied as a solution in a suitable organic solvent such as kerosene, xylene, toluene and other aromatic petroleum solvents. The ready-to-use dusts and solutions can contain from about 90 to 98% by weight of inert diluent or solvent.

The active material can also be formulated as a concentrate composition, suitable for dilution with water, before application to soil or plants. Such formulations can be in the form of finely-divided solids which disperse in water to give finely-divided stable suspensions, or they can be in the form of liquid compositions consisting of active material in a water-immiscible organic solvent carrier which can be easily emulsified in water to form a stable emulsion. The former is a water-dispersible powder concentrate, while the latter is a water-emulsifiable concentrate. Both types of concentrate may contain from about 10% to about 90% of active material depending on the nature of the application and the activity of the herbicidal compound. Such herbicidal concentrates can also contain organic surface active agents of the kind sometimes referred to in the art as wetting, dispersing of emulsifying agents. These surface active agents have several functions, such as causing the compositions to be easily dispersed or emulsified in water to give aqueous sprays (which for the most part constitute desirable media for most applications) or assist in wetting the surfaces of the soil or undesired plants to which the formulation is applied. The organic surface active agents employed can be of the anionic, cationic or nonionic type. Generally the surface active agents will be present only in minor proportion of the formulation, for example, less than 15% and frequently as low as 0.1% by weight of the composition. Usually concentrations of from 0.5 to 10% are found to be most useful.

Thus, the active compound can be incorporated into absorbent materials such as clays, fuller's earth and the like, together with wetting agents such as sodium alkyl naphthalene sulfonates and dispersing agents such as the sodium lignin sulfonates to produce a water-dispersible powder concentrate which can be suspended in water and sprayed onto the soil. Emulsifiable herbicidal concentrate of the active compound can likewise be formulated, for example, using kerosene or xylene or toluene or a high aromatic naphtha as solvent, together with an emulsifying agent which may be of the nonionic type, e.g. octyl- or nonyl-phenol ethylene oxide condensates, or, more preferably, blends of nonionic type surface active agents with oil soluble anionic surface active agents, such as the calcium salt of an aryl alkyl sulfonate. A blend known as "Emcol H 500 H" gives particularly good results.

Examples of herbicidal concentrates formulated in accordance with the invention are as follows:

(1) DISPERSIBLE POWDER CONCENTRATE

| | Percent w./w. |
|---|---|
| Active compound | 40 |
| Belloid NW[1] | 1 |
| Lissatan AC[2] | 2 |
| Clay (kaolin) | 47 |
| Bentonite | 10 |

[1] Product of Geigy, Switzerland.
[2] Product of Imperial Chemical Industries, England.

(2) EMULSIFIABLE CONCENTRATE

| | Percent w./v. |
|---|---|
| Active compound | 50 |
| Encol H 500 X[1] | 10 |
| Xylene, to 100% by volume. | |

[1] Product of Emulsol Corp., U.S.A.

These concentrates can be readily mixed with water as a carrier and sprayed onto weeds or the soil for the purpose of the invention.

We have established that for effective pre-emergent control of grasses, amounts within the range 0.5–60 lb./acre of active compound and preferably 1–25 lb./acre can be used with advantage. Examples of grasses which are controlled are wild oat, brome grass, rye grass, foxtail and crab grass, broadleaved plants including radish, sugar beet, cotton, pigweed, wild buckwheat and tomato have been effected to varying degrees. At rates of application 25–100 lb. per acre, the active compound prevents almost all plant emergence.

The value of the specified N-substituted trichloroacetamidines as pre-emergent herbicides is exemplified by planting in aluminum pans (9½ x 5¼ x 2¼ inches) seeds of 17 different plants each representing a principal botanical type. A good grade of top soil screened through ½" wire mesh is compacted to a depth of ⅜" from the top of the pan. The grass seeds are scattered randomly over half of the soil surface and the broad leaved seeds are scattered randomly over the remaining soil surface.

The required weight of test compound for each rate of application tested was dissolved in acetone (15 cc.). Half of this quantity is then sprayed onto a measured amount of soil, the soil thoroughly mixed and the balance of the chemical sprayed over the surface. After another thorough mixing the treated soil is used to cover the seeds in the pan. After spraying, the pans are placed in ½ inch of water and allowed to absorb moisture through the perforated bottom until the soil surface is about half-moist. The pans are then transferred to a wet sand bench in a greenhouse.

Fourteen days after application of the test chemical, results are observed and recorded. The number of plants of each species which germinate are counted and converted to a herbicidal rating by means of a fixed scale based on average percent germination. Germination rates are established for all new seed lots and periodic checks are run on old seed in current use. The relative value of the test compound with respect to its herbicidal effect on each plant is indicated by a number, as follows:

0—No phytotoxicity
1—Slight toxicity
2—Moderate toxicity
3—Severe toxicity

The following table demonstrates the herbicidal effect of N-phenyl N'-chloro - 2,2,2 - trichloroacetamidine (Compound 1) and N-phenyl-2,2,2-trichloroacetamidine (Compound 2), at a range of application rate (lbs./acre), against each of the species listed below.

| Species | Compound 1 | | | Compound 2 | | |
|---|---|---|---|---|---|---|
| | 10 lbs. | 5 lbs. | 2 lbs. | 10 lbs. | 5 lbs. | 2 lbs. |
| Wild oat | 3 | 3 | 2 | 3 | 3 | 3 |
| Brome grass | 3 | 3 | 3 | 3 | 3 | 3 |
| Corn | | 3 | 0 | | 2 | 2 |
| Barnyard grass | | 3 | 3 | | 3 | 3 |
| Crab grass | 3 | 3 | 3 | 3 | 3 | 3 |
| Pigweed | 3 | 3 | 3 | 3 | 3 | 3 |
| Soybean | 1 | 1 | 0 | 0 | 1 | 1 |

The above results show that soybean and corn are either unaffected or slightly/moderately damaged at a rate of 2 lb./acre, whereas the compounds show a very strong specific herbicidal activity with respect to grasses at this rate.

N-substituted trichloroacetamidines of the above formula wherein X is hydrogen, can be prepared by reacting trichloroacetonitrile with an aniline at room temperature, according to the following equation:

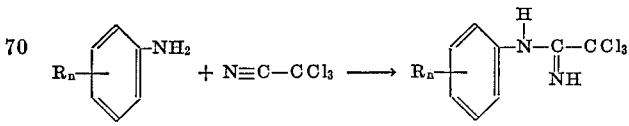

wherein $n$ and R are as defined above, the end product commencing to precipitate after about 24 hours, with yields about 54% after 5 days, the yield increasing to 76% by conducting the reaction in ethanol, and precipitating the end product after 5 days by the addition of water. The said compounds can also be prepared simply and in high yield by reaction of an aniline with an alkyl trichloroacetimidate, according to the following equation:

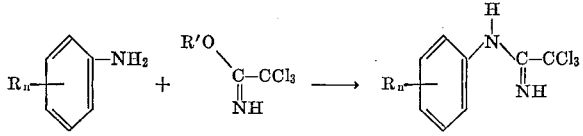

wherein $n$ and R are as defined above and wherein R' is an alkyl group. The alkyl trichloroacetimidates are prepared readily from an alcohol, suitably a primary alcohol, and trichloroacetonitrile in the presence of a basic catalyst.

N-substituted trichloroacetamidines of the above Formula I wherein X is chlorine are new compounds per se and are claimed as such herein. N-substituted trichloroacetamidines of the above formula wherein X is chlorine, can be prepared by the action of a hypochlorite on the parent compound, i.e. by the action of a hypochlorite on an N-substituted trichloroacetamidine of the above Formula I wherein X is hydrogen. Thus, we have found that the N'-chloro derivatives of N-phenyl-2,2,2-trichloroacetamidines can be prepared by reacting the latter with an inorganic hypochlorite, according to the following equation:

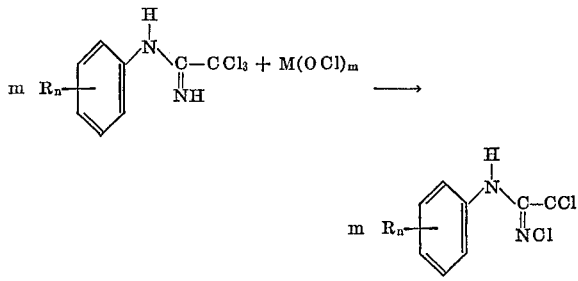

wherein $n$ and R are as defined above and wherein M is an alkali metal or alkaline earth metal, said metal preferably being selected from sodium, potassium and calcium, and wherein $m$ is the valence of M. The reaction can be effected by slowly adding the hypochlorite to the N-phenyl-2,2,2-trichloroacetamidine dissolved in an acidified alcohol solution, the solvent alcohol being acidified to stabilize the end product, and allowing the reaction mixture to stand for a suitable time. The temperature of reaction is kept low to avoid side reactions. The desired N-phenyl-N'-chloro-2,2,2-trichloroacetamidine is precipitated from the reaction mixture, and may be purified by conventional procedure, if desired.

The following practical example is illustrative but not limitative of the above indicated method for the preparation of N-substituted trichloroacetamidines of the above formula wherein X is chlorine:

EXAMPLE

Sodium hypochlorite solution (2.6 N, 4 ml., 0.01 mole) was slowly added to a solution of N-phenyl-2,2,2-trichloroacetamidine (2.4 g., 0.01 mole) in aqueous alcohol (50%, 20 ml.) and concentrated hydrochloric acid (1 ml.), with stirring and ice cooling. After stirring the mixture at room temperature for a further 30 minutes, the precipitated N-phenyl-N'-chloro-2,2,2-trichloroacetamidine was filtered off (yield 80%, M.P. 128) from methanol.

$C_8H_6N_2Cl_4$ requires (percent): C, 35.3; H, 2.2; N, 10.3. Found (percent): C, 35.6; H, 2.2; N, 9.8.

Various changes and modifications of this invention can be made, and, to the extent that such variations incorporate the spirit of this invention, they are intended to be included within the scope of the appended claims.

The embodiments of the invention in which an exclusive property or privilege is claimed are defined as follows:

1. A method of controlling vegetation which comprises applying thereto a herbicidal amount of at least one N-trichloroacetamidine of the formula;

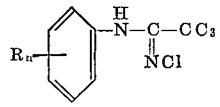

wherein $n$ is an integer from 0 to 2 inclusive; wherein each R is selected from the group consisting of halogen, nitro, and alkoxy of not more than six carbon atoms.

2. A method of controlling vegetation which comprises applying thereto a herbicidal amount of at least one N-trichloroacetamidine of the formula;

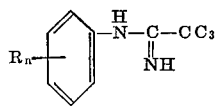

wherein $n$ is an integer from 0 to 2 inclusive; wherein each R is selected from the group consisting of halogen, nitro, alkyl of not more than six carbon atoms, and alkoxy of not more than six carbon atoms.

3. A method in accordance with claim 2 wherein $n$ is 2; each R is independently selected from the group consisting of halogen, nitro, and alkoxy of not more than 6 carbon atoms.

4. A method in accordance with claim 1 wherein the N-trichloroacetamidine is applied to the foliage of the vegetation.

5. A method in accordance with claim 1 wherein the N-trichloroacetamidine is applied to soil containing pre-emergent vegetation.

6. A method in accordance with claim 1 wherein the N-trichloroacetamidine is N-phenyl-N'-chloro-2,2,2-trichloroacetamidine.

7. A method in accordance with claim 1 wherein the N-trichloroacetamidine is N-phenyl-2,2,2-trichloroacetamidine.

8. A method in accordance with claim 1 wherein R is nitro.

References Cited
UNITED STATES PATENTS 3,428,681   2/1969   Kippur et al. _____ 71—88X JAMES O. THOMAS, Jr., Primary Examiner U.S. Cl. X.R.

260—564